United States Patent [19]
Fukushi

[11] Patent Number: 5,658,671
[45] Date of Patent: Aug. 19, 1997

[54] FLUOROELASTOMER COATING COMPOSITION

[75] Inventor: Tatsuo Fukushi, Sagamihara, Japan

[73] Assignee: Minnesota Mining and Manufacturing Company, St. Paul, Minn.

[21] Appl. No.: 539,046

[22] Filed: Oct. 4, 1995

Related U.S. Application Data

[60] Continuation of Ser. No. 427,345, Apr. 24, 1995, abandoned, which is a division of Ser. No. 73,896, Jun. 9, 1993, Pat. No. 5,451,625.

[30] Foreign Application Priority Data

Jun. 11, 1992 [JP] Japan .................... 4-151710

[51] Int. Cl.$^6$ ........................................ B32B 27/00
[52] U.S. Cl. ............... 428/421; 428/411.1; 524/154; 524/236; 524/242; 524/330; 524/346; 524/347
[58] Field of Search ................ 428/421, 411.1; 524/236, 154, 242, 330, 346, 347

[56] References Cited

U.S. PATENT DOCUMENTS 4,552,690 11/1985 Ikeguchi et al. .................. 252/512
5,089,173 2/1992 Fentzel et al. .................... 524/439

FOREIGN PATENT DOCUMENTS 2017167  5/1970  France .
2248459  10/1987  Japan .
2248453  10/1990  Japan .

*Primary Examiner*—Peter D. Mulcahy
*Attorney, Agent, or Firm*—Gary L. Griswold; Walter N. Kirn; Eloise J. Maki

[57] ABSTRACT

A coating composition useful, for example, in the preparation of automotive gaskets and the like, the composition comprising:

(1) a fluoroelastomer;
(2) a quaternary ammonium or quaternary phosphonium salt accelerator;
(3) a polyol;
(4) an acid acceptor;
(5) an oil-soluble chelating agent; and
(6) an organic solvent.

12 Claims, 1 Drawing Sheet

FLUOROELASTOMER COATING COMPOSITION

This is a continuation of application Ser. No. 08/427,345 filed Apr. 24, 1995 now abandoned, which is a division of application Ser. No. 08/073,896 filed Jun. 9, 1993 now U.S. Pat. No. 5,451,625.

FIELD OF THE INVENTION

The present invention relates to a liquid coating composition comprising fluoroelastomer and coatings prepared therefrom.

BACKGROUND

In automotive gaskets, e.g., cylinder gaskets, fluoroelastomer coated metals have been used as substitutes for the asbestos. For example, Japanese Unexamined Patent Publication (Kokai) No. 62-248453 discloses a composition containing a fluoroelastomer, a polyol, a quaternary ammonium salt accelerator or a quaternary phosphonium salt accelerator, and an acid acceptor.

However, such a composition has a short shelf life and, accordingly, was not necessarily satisfactory because it must be cured for a prolonged period.

On the other hand, it has been known that carboxylic acid is used to form a salt or chelate with the metal ion, whereby the metal ion is inactivated in order to extend the shelf life.

However, carboxylic acids are usually hydrophilic and, thus, incompatible with the components of elastomer compositions. Also, it is difficult to add the carboxylic acid to an elastomer composition.

Moreover, a relatively low molecular weight amine accelerates the curing rate when added to a fluoroelastomer composition, but at the same time, it markedly shortens the shelf life and, accordingly, it cannot generally be employed.

Thus, it is an object of this invention to provide a coating composition containing fluoroelastomer having a prolonged shelf life and decreased curing time.

SUMMARY OF THE INVENTION

Figure 1:
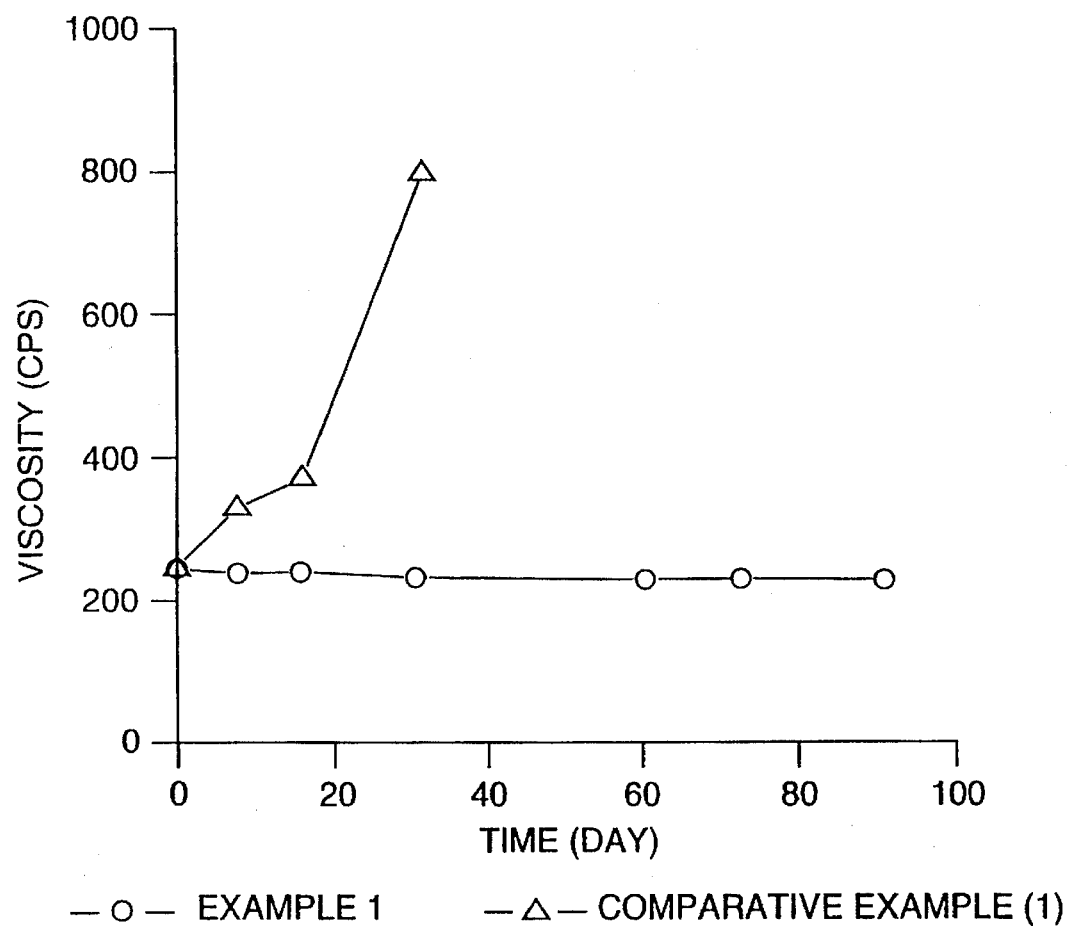
FIG. 1 is a graph that compares the viscosity change over time of a composition of the present invention containing an oil-soluble chelating agent (Example 1) with that of the a composition containing no oil-soluble chelating agent (Comparative Example 1).

A liquid, coating composition comprising the following components:

(1) a fluoroelastomer;
(2) a quaternary ammonium salt or quaternary phosphonium salt accelerator;
(3) a polyol;
(4) an acid acceptor;
(5) an oil-soluble chelating agent; and
(6) an organic solvent.

By adding an oil-soluble chelating agent, the coating composition of the present invention is almost entirely free from any variation of viscosity of the solution during storage, and has a prolonged storage stability. With regard to the curing characteristics, it is advantageous in that the curing time can be shortened. On the other hand, the addition of an oil-soluble chelating agent does not disadvantageously influence the dry physical properties, heat aging, or adhesion characteristics to metals.

DETAILED DESCRIPTION OF THE INVENTION

The present inventors have carried out serious studies in order to solve the above-described object. As a result, it has been discovered that the shelf life can be extended and the curing time can be shortened by adding an oil-soluble chelating agent to a fluoroelastomer composition, whereby the present invention has been achieved.

To be specific, the present invention is to provide a coating composition comprising the following components:

(1) a fluoroelastomer;
(2) a quaternary ammonium salt or quaternary phosphonium salt accelerator;
(3) a polyol;
(4) an acid acceptor;
(5) an oil-soluble chelating agent; and
(6) an organic solvent.

As the fluoroelastomers to be used in the present invention, conventional fluoroelastomers such as vinylidene fluoride-hexafluoropropene copolymers, vinylidene fluoride-hexafluoropropene-tetrafluoroethylene terpolymers, tetrafluoroethylene-propylene copolymers, and the like may be employed.

The accelerators suitable for the present invention are quaternary ammonium salt accelerators or quaternary phosphonium salt accelerators, which are used in combination with polyols as a crosslinking agent. They have the merits of being able to obtain a rapid curing rate and making the shelf life of the composition relatively long.

As the polyols used in combination with the accelerators, 2,2-bis(4-hydroxyphenyl)propane [bisphenol A], 2,2-bis(4-hydroxyphenyl)perfluoropropane [bisphenol AF], hydroquinone, catechol, resorcin, 4,4'-dihydroxydiphenyl, 4,4'-dihydroxyphenylmethane, 4,4'-dihydroxyphenylsulfone, 2,2-bis(4-hydroxyphenyl)butane, and the like are used, with bisphenol A, bisphenol AF and hydroquinone being preferably used. They may be also in the form of their alkali metal salts or alkaline earth metal salts.

As useful quaternary ammonium salts are compounds represented by the following formula (I):

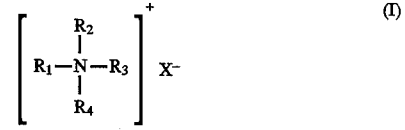

wherein: $R_1$ to $R_4$ are independently selected from the group consisting of alkyl groups, aryl groups, aralkyl groups, alkenyl groups, polyoxyalkylene groups and fluoroalkyl groups; and $X^-$ is an anion selected from the group consisting of halides, hydroxylates, alkoxylates, carboxylates, phenoxides, sulfonates, sulfates, sulfites, carbonates, and nitrates.

Examples of such compounds (I) include tetraphenylammonium chloride, tetraphenylammonium bromide, tetraoctylammonium chloride, tetra-n-butylammonium chloride, tetraethylammonium chloride, tetramethylammonium chloride, tetramethylammonium bromide, triphenylbenzylammonium chloride, triphenylbenzylammonium bromide, triphenylbenzylammonium stearate, triphenylbenzylammonium benzoate, triphenylisobutylammonium bromide, trioctyl-n-butylammonium chloride, trioctylbenzylammonium chloride, trioctylbenzylammonium acetate, triphenyl-2,4-dichlorobenzylammonium chloride, trioctylmethoxyethoxyethylammonium chloride, triphenylethoxycarbonylmethylammonium chloride, triphenylallylammonium chloride, 1-alkyl pyridium salt, 5-aralkyl-1,5-diazabicyclo[4.3.0]-5-nonenium salt, 8-aralkyl-1,8-diazabicyclo[5.4.0]-7-undecenium salt, and the like.

As useful quaternary phosphonium salts are compounds represented by the following formula (II):

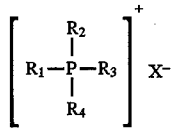

wherein: $R_1$ to $R_4$ are independently selected from the group consisting of alkyl groups, aryl groups, aralkyl groups, alkenyl groups, polyoxyalkylene groups, and fluoroalkyl groups; and $X^-$ is an anion selected from the group consisting of halides, hydroxylates, alkoxylates, carboxylates, phenoxides, sulfonates, sulfates, sulfites, carbonates, and nitrates, and the like.

Examples of such compounds include tetraphenylphosphonium chloride, tetraphenylphosphonium bromide, tetraoctylphosphonium chloride, tetra-n-butylphosphonium chloride, tetraethylphosphonium chloride, tetramethylphosphonium chloride, tetramethylphosphonium bromide, triphenylbenzylphosphonium chloride, triphenylbenzylphosphonium bromide, triphenylbenzylphosphonium stearate, triphenylbenzylphosphonium benzoate, triphenylisobutylphosphonium bromide, trioctyl-n-butylphosphonium chloride, trioctylbenzylphosphonium chloride, trioctylbenzylphosphonium acetate, triphenyl-2,4-dichlorobenzylphosphonium chloride, trioctylmethoxyethylphosphonium chloride, triphenylethoxycarbonylmethylphosphonium chloride, triphenylallylphosphonium chloride, and the like.

Organic solvents useful in the fluoroelastomer coating composition include ketone, alcohol and ester solvents. Suitable organic solvents include methyl isobutyl ketone, methanol, ethanol, isopropanol, ethyl acetate, cellosolve acetate and sorbitol acetate. The organic solvents can be used singly or as a mixture of two or more. However, if a mixture of ketone and alcohol solvents is employed, and the ratio of ketone in the mixture is high, gelation is accelerated and stability improves with time elapsed. If the ratio of alcohol in the mixture is high, the solubility is decreased. The weight ratio of about 90 to 30% of the ketone to about 10 to 70% of the alcohol is preferred as the mixed ratio.

The "oil-soluble chelating agents" used in the present invention are soluble in organic solvents, such as ketones, alcohols or ester solvents which solvents are generally known as solvents for dissolving fluoroelastomers, and chelate metal ions (e.g., $Ca^{2+}$, $Mg^{2+}$, etc.). In general, known chelating agents, for example, ethylene diamine tetraacetic acid (EDTA), are soluble in water but insoluble in organic solvents. Accordingly, they have poor compatibility with the ketone, alcohol, or ester solvents which are used as the organic solvent in this invention. Furthermore, even if one of the water-soluble chelating agents is singly used in the kneading of the fluoroelastomer, no uniform compound can be obtained due to its poor compatibility. However, such water-soluble chelating agents can be made useful in this invention by increasing their lipophilicity by reacting part of the carboxyl groups on the chelating agent with an amine to form an amine salt. Thus, preferred oil-soluble chelating agent are partial alkylamine salts of polybasic carboxylic acids, and they can be prepared by reacting known chelating agents, such as triethylenetetraamine hexaacetic acid (TTHA), ethylenediamine tetraacetic acid (EDTA), diethylenetriamine pentaacetic acid (DTPA), glycol ether diamine tetraacetic acid (GEDTA), and the like, with amines, such as lower alkyl amines (e.g., methyl amine, ethyl amine, n-propyl amine, isopropyl amine, n-butyl amine, and isobutyl amine). Butylamine salts of DTPA, represented by the following formula, are particularly preferable.

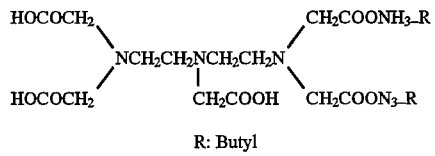

R: Butyl

Because the oil-soluble chelating agents are soluble in organic solvents, their compatibility with the ketone, alcohol, and ester solvents which are used as the organic solvents in the fluoroelastomer coating composition are improved, and simultaneously, their compatibility with the fluoroelastomer during the kneading can also be solved. Specifically, when the oil-soluble chelating agent is used, it is easily dispersed in the coating composition to chelate metal ions effectively, thereby contributing to the stabilization of the shelf life of the fluoroelastomer coating composition.

Although the oil-soluble chelating agent contains at least one amine group, it is blocked by the carboxyl group, so the elastomer components of the composition are stable in the solution. Moreover, since the salt will decompose during the curing of the elastomer components (160°–200° C.), a rapid curing rate of the coating can be obtained.

In the fluoroelastomer coating composition, the polyol in the ratio of about 0.1 to 10 parts, preferably about 0.5 to 6 parts by weight, the quaternary salt accelerator in the ratio of about 0.5 to 10 parts by weight, preferably about 1 to 8 parts by weight, and magnesium oxide in the ratio of about 1 to 30 parts by weight, preferably about 5 to 15 parts by weight, are used respectively, based on 100 parts by weight of the fluoroelastomer. Also, the oil-soluble chelating agent is added in an amount of 0.1 to 5, preferably 0.5 to 3, parts by weight based on 100 parts by weight of the fluoroelastomer. The addition of too large amount of the oil-soluble chelating agent adversely influences the adhering properties with the metal, etc. Conversely, if it is added in too small an amount, the effect of the present invention cannot be obtained. Components (1) through (5) of the fluoroelastomer coating composition are present in the composition at a level of 10 to 40 weight percent. The coating composition is a solution or suspension of components (1) through (5) in the organic solvent.

The production of the fluoroelastomer composition can be carried out by incorporating the respective components in the organic solvent, and thoroughly kneading the whole system. The oil-soluble chelating agent may be either incorporated together with the other components, or added after the other components.

The fluoroelastomer coating composition thus prepared can be used as a fluoroelastomer coating material for coating a metal surface, etc. When coating, this solution is applied on a metal plate treated with a commercially available silicon primer, etc., dried, and adhesion by curing is carried out by heating it in an oven.

EXAMPLES

The present invention will now be described in greater detail with reference to the working examples.

Examples 1 and 2 and Comparative Examples 1 and 2

In order to prepare an octyl amine salt of DTPA, 20 ml of methanol, then 10 g of DTPA and 5.74 g of n-octyl amine were added to a 100 ml volume beaker. The mixture was stirred with a magnetic stirrer overnight to obtain a pale yellow liquid.

Examples 1 and 2 and comparative Examples 1 and 2 were prepared by kneading the ingredients set forth in Table 1 in the usual rolls. In Table 1, the amount of each component is given as parts by weight per 100 parts by weight of the fluoroelastomer.

The kneaded mixtures were then dissolved in a mixture of methyl isobutyl ketone-methanol (mixed ratio: 90:10) so as to be 30% by weight solid concentration.

The liquid fluoroelastomer compositions were then applied to stainless steel plates (SUS 301) treated with a primer containing a silane coupling agent, dried at 120° C. for 30 minutes, and then cured at 200° C. for 4 hours.

The physical properties and heat aging of the resulting fluoroelastomer coating compositions are given in Table 1.

The cure rheology characteristics were measured at 170° C. using a Monsanto ODR Model 2000 rheometer.

The measurements of cure rheology characteristics, physical properties and heat aging characteristics were conducted in accordance with JIS K6301.

The adhesion characteristics of the cured coating composition to the metal sheet were measured by cross-cut and pencil hardness tests (both in accordance with JIS K54000). The results of the tests are given in Table 2. The space on carrying out the square test was 1.0 mm. fluoroelastomer coating composition was evaluated by measuring the time for the composition to gel at room temperature. The results of the stability tests are given in Table 3.

The viscosity change of the composition of Example 1 and Comparative Example 1 as a function of time was measured. The results are depicted in FIG. 1.

TABLE 1

|  | Ex. 1 | Ex. 2 | Comp. Ex. 1 | Comp. Ex. 2 |
| --- | --- | --- | --- | --- |
| Fluoroelastomer[1] | 100 | 100 | 100 | 100 |
| TPBCl[2] | 0.51 | 0.51 | 0.51 | 0.51 |
| Bisphenol AF | 1.91 | 1.91 | 1.91 | 1.91 |
| MT carbon black | 30 | 30 | 30 | 30 |
| Magnesium Oxide[3] | 10 | 10 | 10 | 10 |
| Calcium Hydroxide[4] |  | 1 |  | 1 |
| Octyl amine salt of DTPA | 1 | 1 |  |  |
| Cure rheology @ 170° C. |  |  |  |  |
| Time (min.) | 24 | 12 | 24 | 12 |
| Minimum torque (in-lb) | 8 | 8 | 9 | 10 |
| Maximum torque (in-lb) | 94 | 87 | 63 | 54 |
| t' 90 (min.) | 12.4 | 7.9 | 15.4 | 9.6 |
| Physical properties |  |  |  |  |
| Press cure time (min.) @ 170° C. | 15 | 10 | 24 | 12 |
| Post cure, 24 hrs. @ 230° C. |  |  |  |  |
| Tensile (kg/cm$^2$) | 157 | 154 | 148 | 141 |
| 100% Modulus (kg/cm$^2$) | 56 | 56 | 260 | 290 |
| Elongation (%) | 230 | 210 | 44 | 44 |
| Hardness | 80 | 80 | 77 | 77 |
| Heat aging, 70 hrs. @ 250° C. |  |  |  |  |

TABLE 1-continued

|  | Ex. 1 | Ex. 2 | Comp. Ex. 1 | Comp. Ex. 2 |
| --- | --- | --- | --- | --- |
| Tensile change (%) | −10 | −9 | −3 | −5 |
| Elongation change (%) | −14 | 0 | +6 | −5 |
| Harness points change | +2 | +2 | +2 | +3 |

[1]FLUOREL ™ fluoroelastomer FC-2145
[2]Tribenzylphosphonium chloride
[3]Kyowa MgO #30
[4]RENOFITE, available commercially from Rhein Chemical, Germany

TABLE 2

|  | Ex. 1 | Ex. 1' | Ex. 2 | Comp. Ex. 1 | Comp. Ex. 2 |
| --- | --- | --- | --- | --- | --- |
| Pencil Hardness Test (Pencil Hardness) | H | H | H | H | H |
| Cross-cut Test (points) | 10 | 10 | 10 | 10 | 10 |

In Example 1', the sample of Example 1 was stored for 3 months, and the test was then conducted.

TABLE 3

|  | Ex. 1 | Ex. 2 | Comp. Ex. 1 | Comp. Ex. 2 |
| --- | --- | --- | --- | --- |
| Time to gelation | Not gelled after more than 3 months | More than one month | 15 days | 4 days |

I claim:

1. An article coated with a coating composition which comprises fluoroelastomer, and for each 100 parts by weight of the fluoroelastomer:

(1) quaternary ammonium or quaternary phosphonium accelerator, (2) polyol, (3) acid acceptor, (4) about 0.1 to 5 parts by weight of oil-soluble chelating agent selected from the group consisting of partial alkylamine salts of polybasic carboxylic acid, (5) organic solvent.

2. An article according to claim 1, wherein the amounts of components (1) to (3) per 100 parts by weight of fluoroelastomer are as follows:

(1) about 0.5 to 10 parts by weight of quaternary ammonium or quaternary phosphonium accelerator, (2) about 0.1 to 10 parts by weight of polyol, and (3) about 1 to 30 parts by weight of acid acceptor.

3. An article according to claim 1, wherein the oil-soluble chelating agent is selected from the group consisting of: ethylenediamine tetraacetic acid, glycol ether diamine tetraacetic acid and diethylenetriamine pentaacetic acid.

4. An article according to claim 1, wherein the fluoroelastomer is selected from the group consisting of: vinylidene fluoride-hexafluoropropene copolymer, vinylidene fluoride-hexafluoropropene tetrafluoroethylene terpolymer, and tetrafluoroethylene-propylene copolymer.

5. An article according to claim 1, wherein the polyol is selected from the group consisting of: 2,2-bis(4-hydroxyphenyl)propane, 2,2-bis(4-hydroxyphenyl) perfluoropropane, hydroquinone, catechol, resorcin, 4,4'-dihydroxydiphenyl, 4,4'-dihydroxyphenylmethane, 4,4'-dihydroxyphenylsulfone, and 2,2-bis(4-hydroxyphenyl) butane.

6. An article according to claim 1, wherein the quaternary ammonium accelerator salt is a compound represented by the following formula:

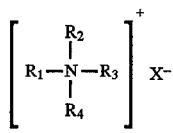

wherein;

$R_1$ to $R_4$ are independently selected from the group consisting of alkyl groups, aryl groups, aralkyl groups, alkenyl groups, polyoxyalkylene groups and fluoroalkyl groups; and $X^-$ is an anion selected from the group consisting of halides, hydroxylates, alkoxylates, carboxylates, phenoxides, sulfonates, sulfates, sulfites, carbonates, and nitrates.

7. An article according to claim 1, wherein the quaternary ammonium accelerator is selected from the group consisting of: tetraphenylammonium chloride, tetraphenylammoniumbromide, tetraoctylammonium chloride, tetra-n-butylammonium chloride, tetraethylammonium chloride, tetramethylammonium chloride, tetramethylammoniumbromide, triphenylbenzylammonium chloride, triphenylbenzylammonium bromide, triphenylbenzylammonium stearate, triphenylbenzylammonium benzoate, triphenylisobutylammoniumbromide, trioctyl-n-butylammonium chloride, trioctylbenzylammonium chloride, trioctylbenzylammonium acetate, triphenyl-2,4-dichlorobenzylammonium chloride, trioctylmethoxyethoxyethylammonium chloride, triphenylethoxycarbonylmethylammonium chloride, triphenylallylammonium chloride, 1-alkyl pyridium salt, 5-aralkyl-1,5-diazabicyclo [4.3.0]-5-nonenium salt, and 8-aralkyl-1,8-diazabicyclo [5.4.0]-7-undecenium salt.

8. An article according to claim 1, wherein the quaternary phosphonium accelerator salt is a compound represented by the following formula:

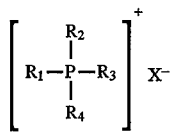

wherein:

$R_1$ to $R_4$ are independently selected from the group consisting of alkyl groups, aryl groups, aralkyl groups, alkenyl groups, polyoxyalkylene groups, and fluoroalkyl groups; and $X^-$ is an anion selected from the group consisting of halides, hydroxylates, alkoxylates, carboxylates, phenoxides, sulfonates, sulfates, sulfites, carbonates, and nitrates.

9. An article according to claim 1, wherein the phosphonium chloride accelerator salt is selected from the group consisting of: tetraphenylphosphonium chloride, tetraphenylphosphonium bromide, tetraoctylphosphonium chloride, tetra-n-butylphosphonium chloride, tetraethylphosphonium chloride, tetramethylphosphonium chloride, tetramethylphosphonium bromide, triphenylbenzylphosphonium chloride, triphenylbenzylphosphonium bromide, triphenylbenzylphosphonium stearate, triphenylbenzylphosphonium benzoate, triphenylisobutylphosphonium bromide, trioctyl-n-butylphosphonium chloride, trioctylbenzylphosphonium chloride, trioctylbenzylphosphonium acetate, triphenyl-2,4-dichlorobenzylphosphonium chloride, trioctylmethoxyethoxyethylphosphonium chloride, triphenylethoxycarbonylmethylphosphonium chloride, and triphenylallylphosphonium chloride.

10. An article according to claim 1, wherein the organic solvent is selected from the group consisting of: ketone, ester, alcohol or mixtures thereof.

11. An article having a cured, fluoroelastomer coating that is prepared by heating a coated article according to claim 1 until the desired state of cure is achieved.

12. An article according to claim 1, wherein the fluoroelastomer and components (1) through (4) of the composition comprise 90 to 60 weight percent of the composition and component (5) of the composition comprises 10 to 40 weight percent of this component.

* * * * *